(12) United States Patent
Shanks

(10) Patent No.: US 9,951,609 B2
(45) Date of Patent: Apr. 24, 2018

(54) DATA COMMUNICATIONS SYSTEM

(71) Applicant: Zenith Oilfield Technology Limited, Aberdeenshire, Scotland (GB)

(72) Inventor: David Sirda Shanks, Scotland (GB)

(73) Assignee: Zenith Oilfield Technology Limited, Scotland (GB)

( * ) Notice: Subject to any disclaimer, the term of this patent is extended or adjusted under 35 U.S.C. 154(b) by 253 days.

(21) Appl. No.: 14/383,745

(22) PCT Filed: Feb. 28, 2013

(86) PCT No.: PCT/GB2013/050510
§ 371 (c)(1),
(2) Date: Sep. 8, 2014

(87) PCT Pub. No.: WO2013/132232
PCT Pub. Date: Sep. 12, 2013

(65) Prior Publication Data
US 2015/0176397 A1    Jun. 25, 2015

(30) Foreign Application Priority Data

Mar. 8, 2012 (GB) .................................. 1204126.5
May 24, 2012 (GB) .................................. 1209141.9
(Continued)

(51) Int. Cl.
*G01V 3/00* (2006.01)
*E21B 47/12* (2012.01)
(Continued)

(52) U.S. Cl.
CPC ............ *E21B 47/12* (2013.01); *E21B 43/128* (2013.01); *H04B 3/54* (2013.01); *H04B 2203/5466* (2013.01); *H04B 2203/5475* (2013.01)

(58) Field of Classification Search
CPC ...... E21B 47/12; E21B 47/122; E21B 17/028; E21B 43/128; E21B 17/003;
(Continued)

(56) References Cited

U.S. PATENT DOCUMENTS 3,959,767 A    5/1976    Smither et al.
4,157,535 A    6/1979    Balkanli
(Continued)

FOREIGN PATENT DOCUMENTS

CN    1152784 A    6/1997
CN    1988404 A    6/2007
(Continued)

OTHER PUBLICATIONS

Unofficial English Translation of Chinese Office Action issued in connection with corresponding CN Application No. 201380012799.X dated Aug. 5, 2015.
(Continued)

*Primary Examiner* — Joseph Feild
*Assistant Examiner* — Rufus Point
(74) *Attorney, Agent, or Firm* — GE Global Patent Operation

(57) ABSTRACT

A three phase power system provided with a data communications system and associated method of data transmission for transmitting data over a three phase power system between a surface and a sub-surface location for an arrangement such as an oil field electrical submersible pump, the data communications system comprising a cabled connection from a surface system to a sub-surface system; a power module coupled to the cabled connection via a tuned circuit tuned to a first frequency, a data signal module coupled to the cabled connection via a tuned circuit tuned to a second frequency, independently of the coupled power module so as
(Continued)

to minimize interference between the power signal module and data signal module during operation.

19 Claims, 4 Drawing Sheets

(30) Foreign Application Priority Data

Jul. 4, 2012 (GB) .................. 1211806.3
Aug. 28, 2012 (GB) .................. 1215281.5

(51) Int. Cl.
*H04B 3/54* (2006.01)
*E21B 43/12* (2006.01)

(58) Field of Classification Search
CPC ....... E21B 33/0355; E21B 34/10; H04B 3/54; H04B 2203/5466; H04B 2203/5475
See application file for complete search history.

(56) References Cited

U.S. PATENT DOCUMENTS

| | | | | |
|---|---|---|---|---|
| 4,739,325 A * | 4/1988 | MacLeod | ............... | E21B 17/003 324/342 |
| 4,788,545 A * | 11/1988 | Farque | ................... | E21B 47/12 166/66 |
| 5,334,877 A | 8/1994 | Mohan et al. | | |
| 5,493,288 A * | 2/1996 | Henneuse | ............... | E21B 47/12 340/853.3 |
| 5,515,038 A | 5/1996 | Smith | | |
| 5,677,974 A | 10/1997 | Elms et al. | | |
| 5,941,307 A | 8/1999 | Tubel | | |
| 5,995,020 A * | 11/1999 | Owens | ................... | E21B 47/12 166/250.01 |
| 6,260,615 B1 | 7/2001 | Dalrymple et al. | | |
| 6,396,415 B1 | 5/2002 | Bulmer | | |
| 6,459,557 B1 | 10/2002 | Haensgen et al. | | |
| 6,587,037 B1 * | 7/2003 | Besser | .................. | E21B 43/128 340/538.11 |
| 7,615,893 B2 | 11/2009 | Biester et al. | | |
| 7,660,365 B2 | 2/2010 | Koga et al. | | |
| 7,686,074 B2 | 3/2010 | McCoy et al. | | |
| 7,982,633 B2 * | 7/2011 | Booker | ................... | H04B 3/54 340/853.3 |
| 8,174,145 B2 | 5/2012 | Goedecke et al. | | |
| 8,362,916 B2 | 1/2013 | Tjhang et al. | | |
| 2003/0151977 A1 | 8/2003 | Shah et al. | | |
| 2005/0190584 A1 | 9/2005 | Hernandez-Marti et al. | | |
| 2005/0283277 A1 * | 12/2005 | Schulz | ............... | E21B 41/0021 700/282 |
| 2006/0145833 A1 | 7/2006 | Brandt et al. | | |
| 2006/0247861 A1 * | 11/2006 | McCoy | ................... | G01V 1/40 702/14 |
| 2007/0138867 A1 | 6/2007 | Choi et al. | | |
| 2008/0112885 A1 | 5/2008 | Okunev et al. | | |
| 2008/0272932 A1 * | 11/2008 | Booker | ................... | H04B 3/54 340/854.9 |
| 2008/0273602 A1 | 11/2008 | Glen | | |
| 2009/0021393 A1 | 1/2009 | Layton et al. | | |
| 2009/0044938 A1 | 2/2009 | Crossley et al. | | |
| 2009/0133487 A1 | 5/2009 | Jeffryes | | |
| 2009/0250210 A1 | 10/2009 | Allen et al. | | |
| 2010/0194585 A1 | 8/2010 | Skinner et al. | | |
| 2011/0075304 A1 | 3/2011 | Hamer | | |
| 2011/0205080 A1 | 8/2011 | Millot et al. | | |
| 2011/0301850 A1 | 12/2011 | Maao | | |
| 2012/0008961 A1 | 1/2012 | Chen et al. | | |
| 2012/0026003 A1 | 2/2012 | Layton | | |
| 2012/0037354 A1 | 2/2012 | McCoy et al. | | |
| 2012/0194313 A1 | 8/2012 | Wohlforth | | |
| 2014/0152459 A1 * | 6/2014 | Olson | ................... | H04B 3/23 340/854.9 |
| 2015/0176397 A1 * | 6/2015 | Shanks | ................... | H04B 3/54 340/854.9 |

FOREIGN PATENT DOCUMENTS

| | | |
|---|---|---|
| CN | 101015108 A | 8/2007 |
| CN | 101056181 A | 10/2007 |
| CN | 101218756 A | 7/2008 |
| CN | 101263663 A | 9/2008 |
| CN | 102369461 A | 3/2012 |
| GB | 2283889 A | 5/1995 |
| GB | 2352150 A | 1/2001 |
| GB | 2394631 A | 4/2004 |
| GB | 2401295 A | 11/2004 |
| GB | 2416097 A | 1/2006 |
| GB | 2483384 A | 3/2012 |
| WO | 200186831 A1 | 11/2001 |
| WO | 2008011889 A1 | 1/2008 |
| WO | 2011072732 A1 | 6/2011 |
| WO | 2012004000 A2 | 1/2012 |

OTHER PUBLICATIONS

Non-Final Office Action issued in connection with related U.S. Appl. No. 14/383,719 dated Mar. 22, 2016.
Non-Final Office Action issued in connection with related U.S. Appl. No. 14/383,790 dated Mar. 28, 2016.
Unofficial English Translation of Chinese Office Action issued in connection with related CN Application No. 201380012881.2 dated Jun. 30, 2015.
Unofficial English Translation of Chinese Office Action issued in connection with related CN Application No. 201380012666.2 dated Jul. 1, 2015.
David Sirda Shanks, U.S. Appl. No. 14/383,719, filed Sep. 8, 2014.
David Sirda Shanks, U.S. Appl. No. 14/383,769, filed Sep. 8, 2014.
David Sirda Shanks, U.S. Appl. No. 14/383,790, filed Sep. 8, 2014.
International Search Report and Written Opinion issued in connection with corresponding PCT Application No. PCT/GB2013/050510 dated Apr. 26, 2013.
International Search Report and Written Opinion issued in connection with corresponding PCT Application No. PCT/GB2013/050512 dated Apr. 26, 2013.
International Search Report and Written Opinion issued in connection with corresponding PCT Application No. PCT/GB2013/050511 dated May 3, 2013.
International Search Report and Written Opinion issued in connection with corresponding PCT Application No. PCT/GB2013/050508 dated Jun. 14, 2013.
Unofficial English translation of Office Action issued in connection with corresponding CN Application No. 201380012798.5 dated Sep. 1, 2015.
Great Britain Search Report issued in connection with related GB Application No. 1204126.5 dated Aug. 20, 2012.
U.S. Non-Final Office Action issued in connection with related U.S. Appl. No. 14/383,769 dated Aug. 10, 2016.
U.S. Final Office Action issued in connection with related U.S. Appl. No. 14/383,719 dated Sep. 6, 2016.
U.S. Final Office Action issued in connection with related U.S. Appl. No. 14/383,790 dated Sep. 22, 2016.
U.S. Advisory Action issued in connection with related U.S. Appl. No. 14/383,790 dated Dec. 13, 2016.
U.S. Non-Final Office Action issued in connection with related U.S. Appl. No. 14/383,769 dated Feb. 17, 2017.
U.S. Final Office Action issued in connection with related U.S. Appl. No. 14/383,719 dated Apr. 12, 2017.
Great Britain Office Action issued in connection with related GB Application No. 1204126.5 dated Apr. 25, 2017.

* cited by examiner

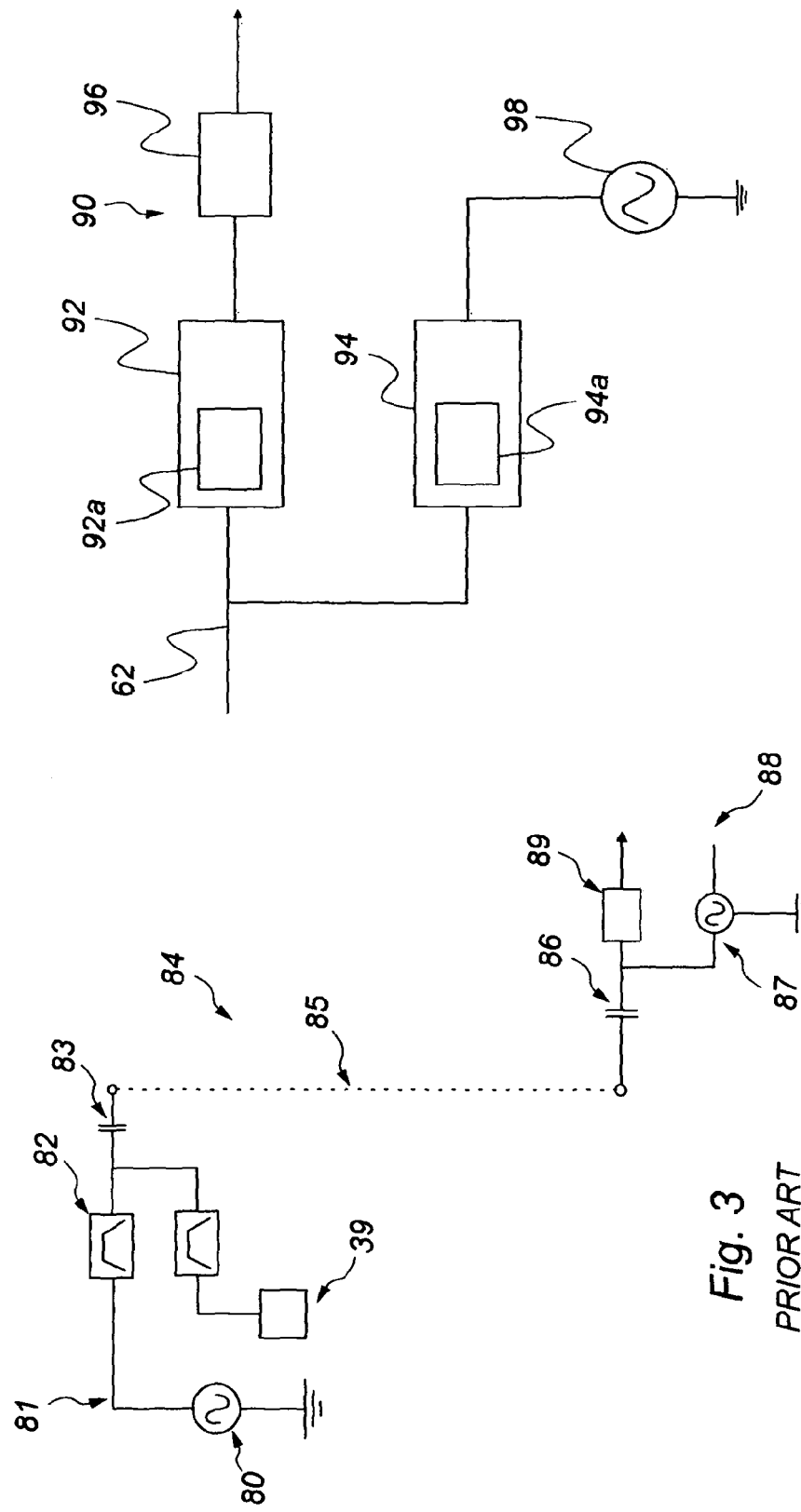

DATA COMMUNICATIONS SYSTEM

BACKGROUND OF THE INVENTION

The present invention relates to data transmission to and from down hole equipment and in particular, though not exclusively, to an improved data communication system and a method of data transmission through a three phase power system between the subsurface and a surface location.

"Down hole equipment" is understood to refer to any tool, equipment or instrument that is used in a wellbore.

Data needs to be transmitted between down-hole equipment and the surface for various reasons. For example, monitoring performance of motors/pumps; transmission of control signals for control of valves; measuring device orientation and position, and making physical measurements.

For motorised down hole equipment, such as an Electric Submersible Pump (ESP) motor system, data needs to be sent from below the equipment in a circuit that includes motor windings and the equipment's power cable which can be considered as a three phase power system. In such arrangements, as power cables are already present, there is the rationale that the cost of the solution of using these should be proportionately less than a solution where an appropriate length of communication cables is also supplied. It is also generally accepted that being able to maintain power on the down hole monitoring instrumentation when the main 3-phase power system is not powered up is needed, as this provides essential information in the event of pump shut downs or other major events in the well.

Thus these systems are challenging to design and operate to ensure data is successfully transmitted and an independent power supply is maintained at all times.

Due to the motor and power cable properties of a three phase power system, DC current based devices which are coupled to the power system using inductive couplings have been developed and are extensively used. Power is provided from a low current DC power supply at surface and data is transmitted to surface by modulating the current drawn from this supply.

Examples of digital and processor based devices are disclosed in U.S. Pat. No. 5,515,038; GB2283889 and U.S. Pat. No. 6,396,415. These systems utilise DC current injected onto the power signal and extracted through inductive Y-point couplings. These systems are all susceptible to failure when insulation on the power cable is lost or damaged, as any fault is in parallel with the independent power source, and the fault becomes another current modulation source thus causing signal integrity to be lost. These prior art systems are also typically either analogue in nature, thus introducing noise into the measurements or, where digital data is transmitted, it is at a very slow data rate.

AC based systems which make use of AC power and/or signal transmission have been developed to overcome these problems. However, these AC based systems introduce disadvantages of their own. A typical prior art AC based system is disclosed in U.S. Pat. No. 7,982,633 being a data communication system for use in downhole applications wherein electrical energy is supplied over a multiple-conductor power cable to an ESP motor assembly. A downhole unit is AC-coupled to the conductors of the power cable through the wye point of the ESP motor assembly. A surface unit is AC-coupled to the conductors of the power cable. Uplink communication of telemetry data occurs over an AC communication scheme supported by the downhole unit and the surface unit. Downlink communication of remote control command data occurs over a different AC communication scheme supported by the surface unit and the downhole unit. These AC communication schemes provide an independent supply of power to the downhole environment. All communication between the surface and downhole environment is accomplished through the power cable without the use of additional communication lines. Data communication is maintained in the event of a ground fault on the power cable.

This prior art AC based system has an interface circuit including an AC coupling capacitor between the wye point of the ESP motor and components of the down hole unit to provide for DC signal isolation. Likewise at the surface, an AC coupling capacitor is electrically coupled to a different one of each of the three conductors on the three-phase power cable for DC signal isolation. Disadvantageously, this arrangement means that the motor's power system is sensed using the same capacitors used to inject the AC power. This causes the signal amplitude to be reduced and thus, as the power supply system can cause distortion and attenuation of the transmitted and received data, the data becomes corrupted which results in data not being recoverable.

SUMMARY OF THE INVENTION

It is therefore an object of the present invention to provide a method of data transmission for transmitting data over a three phase power system wherein the effect of the power system on the data signal integrity can be minimised.

According to a first aspect of the invention there is provided a data communications system for transmitting data over a three phase power system between a surface and a sub-surface location, said data communications system comprising a surface system module, a sub-surface system module, and a cable connection provided between the surface system module and the sub-surface system module wherein at least one of the surface system module and subsurface system module is provided with an AC power module and a data signal module such that the AC power module and the data signal module are coupled to the cabled connection independently of one another via tuned circuits which are tuned to different frequencies at at least one of the surface and sub-surface.

A data communications system having a sub-surface system with a power module and data signal module coupled independently of one another to the cabled connection means that the power coupling and the signal coupling can be optimised for the power signal and data signals applied so that the applied signals do not interfere with one another, or the host 3-phase power system. By providing an AC power supply and an AC data signal, the frequency of these inputs can be selected or tuned to ensure that interference between the inputs is minimised. The provision of a tuned circuit in the power module and in the data signal module also means that each independent coupling can be tuned to the exact frequency for the power and data signals respectively thus ensuring the two do not interfere with one another. In addition, the impedance of the power module and data signal module are relatively high at the data or carrier frequency of the system thus ensuring that signal and power attenuation and distortion is minimised.

In an embodiment, the tuned circuits are capacitive coupled. This is in contrast to inductive coupling which would restrict the bandwidth of any transmitted data or power frequencies, and would not inherently prevent the AC power interfering with the data signal and visa-versa. By using both capacitive and tuned couplings, for both the AC power and data signal to and from the sub-surface, the power and data frequencies can both be relatively high frequencies relative to the 3 phase host frequency but can also be made to be sufficiently different from each other that the coupling tuning prevents mutual interference and in particular the power frequency from interfering with the transmitted data.

In an embodiment, the power module and the data signal module are coupled to a common Y-point at the sub-surface location. This simplifies construction. In an embodiment, the power module and the data signal module are also coupled to a common point at the surface location. In this way parallel tuned coupling are provided at the common points.

The system may further comprise each of the surface system module and sub-surface system module being provided with a power module and a data signal module.

By providing each of the surface and sub-surface system modules with a power module and a data signal module the power coupling and signal coupling both at the surface and at the subsurface locations can be optimised for the power signal and the data signals applied so that the applied signals do not interfere with one another or the host three phase system.

In an embodiment, the system includes a motor at the sub-surface location. In an embodiment, the motor is an electrical submersible pump motor. In an embodiment, the common Y-point is at the motor. In this way standard industry fittings can be used.

In an embodiment, the system includes a down hole gauge at the subsurface location, wherein the three phase power supply is used to power the motor and the power and data signal modules are used for the down hole gauge. In this way, the frequency of the power module can be selected to be greater than the motor power frequency and also not at a harmonic of the motor power frequency. The frequency of the power module need not be too high because if you simply make the power module frequency very high so the filter separates the motor power frequency from the power module frequency you will end up with a power module frequency that is so high the losses in the cable and motor will be too great to actually allow power to be delivered to the down hole gauge. The only way to make this scheme work is to use a frequency selected so it is higher than the power frequency but not so high the power won't get to the gauge (or require excessive surface voltage, and power) and to overcome the still significant power from the motor using a tuned selective power coupling.

According to a second aspect of the invention there is provided a method of data transmission for transmitting data over a three phase power system between a surface and a sub-surface location, the method comprising providing a cabled connection between a surface system and a sub-surface system; providing at least one AC power module coupled to the cabled connection via a first tuned circuit being tuned to a first frequency; and providing at least one data signal module coupled to the cabled connection independently of the power module, via a second tuned circuit being tuned to a second frequency distinct from the first frequency.

The method may further comprise providing a power module and a data signal module at each of a surface system and the sub-surface system.

By providing a power module and data signal module coupled independently of one another to the cabled connection at one or both of the surface and sub-surface locations the power coupling and the signal coupling can be optimised for the power signal and data signals applied so that they do not interfere with one another. The power coupling and data signal coupling can also be designed to minimise the effect of the host three-phase power system on the independent power transmission and the data transmission. By providing an AC power supply and an AC data signal, the frequency of these inputs can be selected and tuned to ensure that interference between the inputs is minimised.

In an embodiment, the method further comprises providing an AC data signal to the data signal module. By providing an AC power supply and an AC data signal, the frequency of these inputs can be selected and tuned to ensure that interference between the inputs is minimised.

In an embodiment, the AC data signals are transmitted in the frequency range of 10 kHz to 300 kHz, and the AC power frequencies are transmitted in the frequency range of 500 Hz to 10 Khz.

In an embodiment, the method comprises capacitively coupling the AC power module to the cabled connection. In an embodiment, the method comprises capacitively coupling the data signal module to the cabled connection. In an embodiment, the method comprises coupling the AC power module and the data signal module through a common point on the cabled connection.

BRIEF DESCRIPTION OF THE DRAWINGS

The present invention will now be described, by way of example only, with reference to the accompanying drawings, in which:

FIG. 3 shows a schematic block diagram of a known three phase power supply transmission system arrangement;

FIG. 4 shows a schematic block diagram of a sub-surface unit of a data communications system according to a second embodiment of the present invention.

DETAILED DESCRIPTION

One category of down hole equipment is artificial lift systems, for use in wells where there is insufficient pressure in the reservoir to lift the well's fluid (e.g. oil, water or gas) to the surface. Types of artificial lift systems include hydraulic pumps, Rod pumps, Electric Submersible Pumps (ESPs), Jet Pumps, Progressing-Cavity pumps (PCPs) and gas lift.

Figure 1:
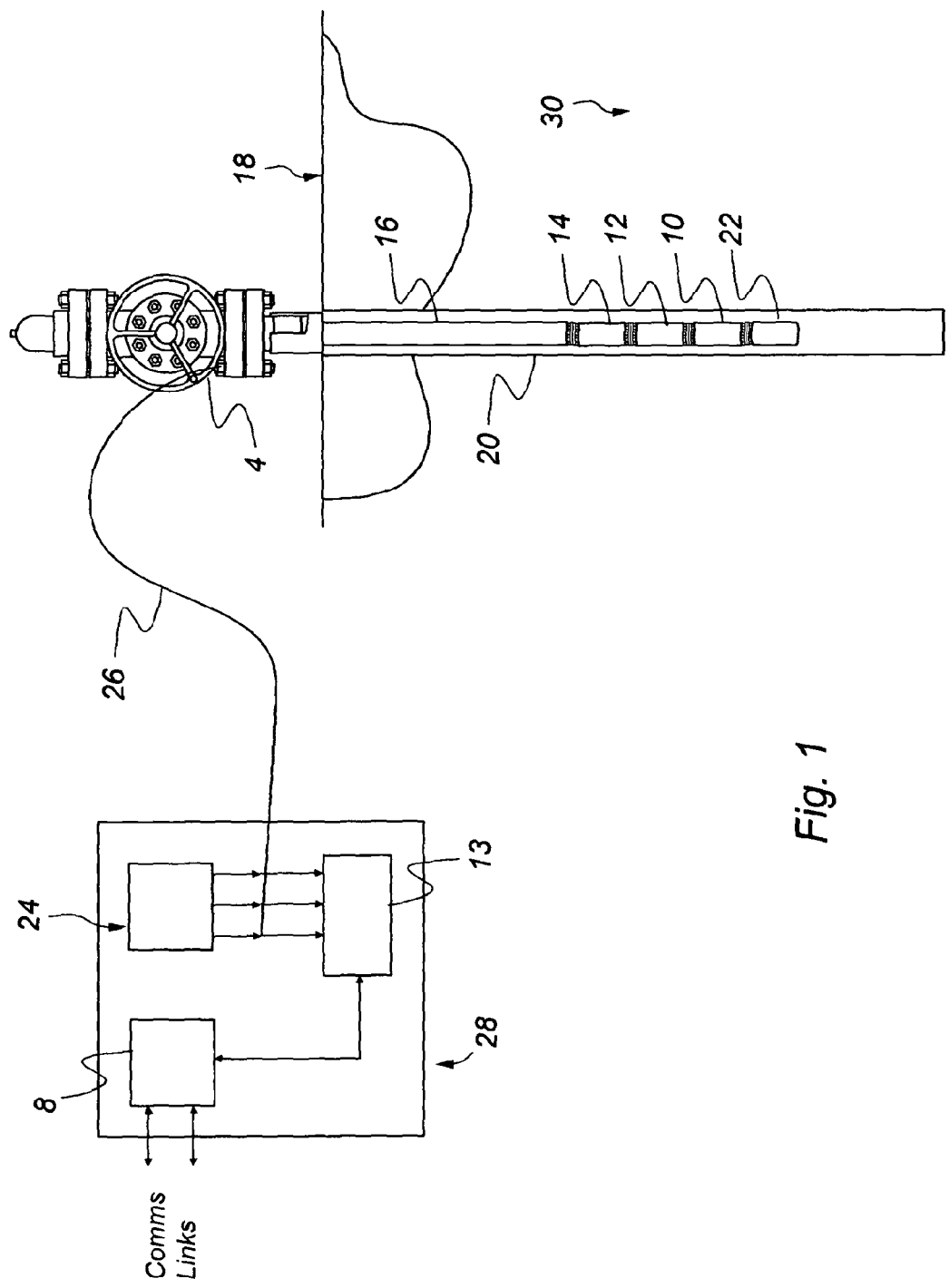
FIG. 1 shows the typical set up of a down hole equipment in a well, showing the positions of the equipment, the motor and the control interfaces at the surface.

Reference is initially made to FIG. 1 of the drawings which illustrates a typical ESP completion in a wellbore. An ESP motor 10 is coupled through a seal 12 to a centrifugal pump 14 and used to lift the fluids through a tubing 16 to a surface 18 of the well 20 in a manner known to those skilled in the art. In order to monitor the operation, sensors or gauges 22 are located below the ESP 10. Typically, the motor 10 is a three phase Y configuration. The motor is driven by a variable speed drive system 24 and is connected via a three phase power cable 26. The system can be considered to comprise two distinct parts, a surface system, generally indicated by reference numeral 28, and a down hole system, generally indicated by reference numeral 30. These two parts 28, 30 communicate using the ESP power cable 26.

Surface equipment relating to the gauge system is shown in FIG. 1 where there is a HV unit 13 connected directly to the 3 phase power supply to the down hole motor and there is a further LV or low voltage unit 8 which is safely isolated from the high voltage system. The LV system is primarily for data recovery and processing and data display etc. The HV unit is used to inject AC power and also make recovery of raw data from the 3-phase power system.

Figure 2:
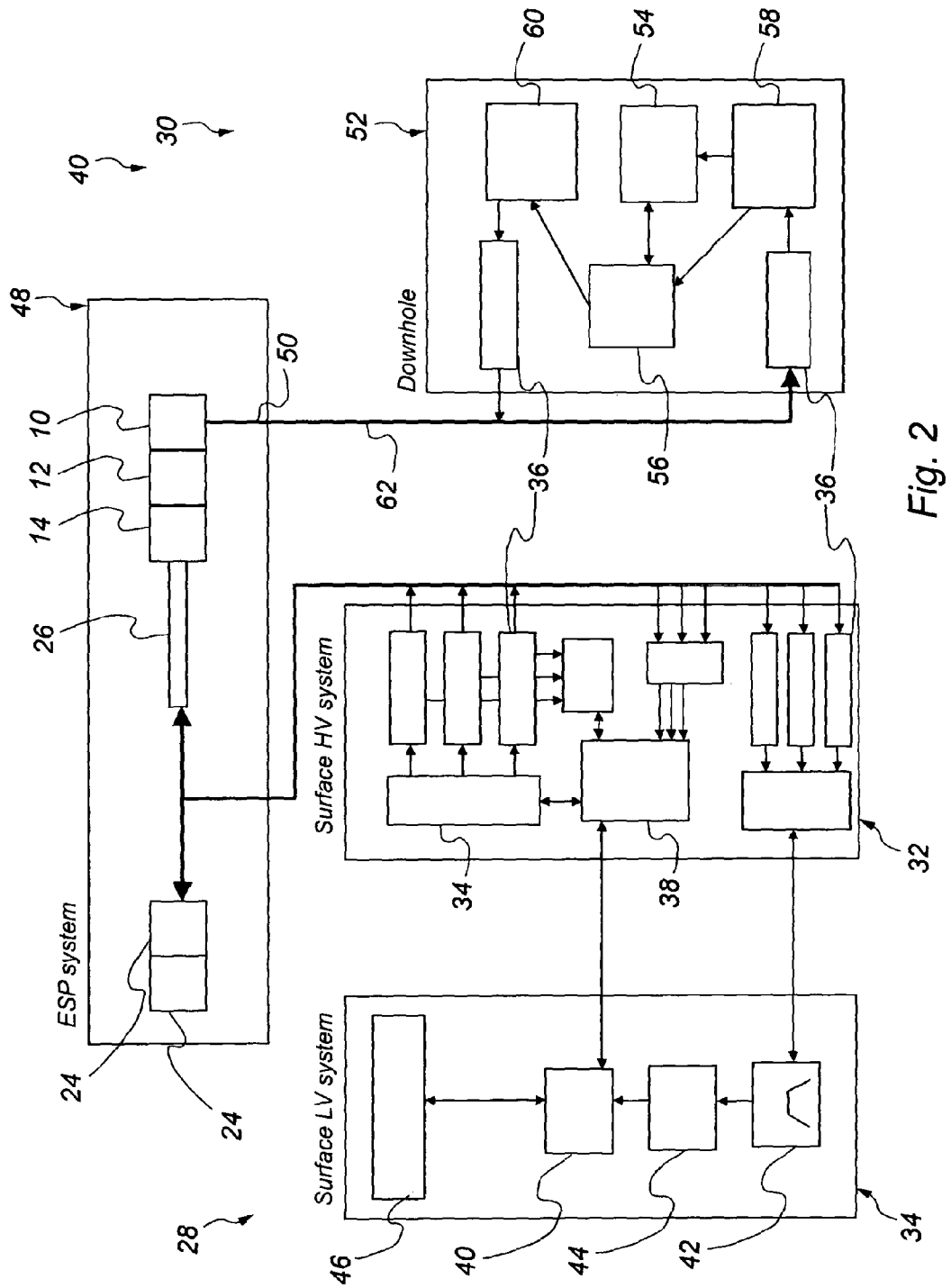
FIG. 2 shows a schematic block diagram of a data communication system according to a first embodiment of the present invention.

Referring now to FIG. 2 of the drawings there is illustrated a functional block diagram of a data transmission system, generally indicated by reference numeral 40, according to an embodiment of the present invention. In this arrangement data can be transmitted onto the three phase power cable 26 in either direction between the surface equipment 28 and subsurface or down hole equipment 30.

At surface 28 the equipment is divided into a high voltage side 32 and a low voltage side 34. The high voltage side 32 provides the power to the down hole system 30. Tuned high-voltage AC coupling 36a is used to connect to each of the phases in the power cable 26. Thus a tripling of circuitry is used in the high-voltage equipment 32. A microprocessor 38 controls the power distribution on to the three-phase cable 26 and is linked to a corresponding microprocessor 40 on the low voltage side 34. Additionally the high-voltage side 32 uses tuned high-voltage AC coupling 36c, in parallel to pick off the data signals on the three-phase cable 26. These signals are then filtered 42 and de-modulated 44 by known methods. Data signals then pass via the microprocessor 40 for display 46 or transport to a data logger or SCADA system. Additionally, the process can work in reverse where microprocessor 40 provides data on to the power lines 26 via the tuned high-voltage AC coupling 36 on the high-voltage side 32 as is known in the art.

Down hole an ESP system 48 is provided as described herein with reference to FIG. 1. Like parts have the same reference numerals to aid clarity. Below the motor 10 is a standard Y-point connector 50. At the Y-point connector 50 is arranged a down hole system 52. The down hole system 52 provides monitoring in the form of measurement devices sensors or gauges 54, hooked up via a microprocessor 56. Power to drive the gauges 54 is provided via tuned HV AC coupling circuits 36b to a power regulator 58. Similarly, data from the measurement devices 54 is processed in the microprocessor 56. Using a signal driver 60 and tuned HV AC coupling circuits 36d, the data is transmitted on to the power line 62 for transmission to the Y-point 50 and onward transmission up the three-phase power cable 26 to the surface units 28.

In the present invention, there are four tuned HV AC coupling circuits 36a-d, three arranged at surface 28 and one sub-surface 52. In the prior art only a single tuned HV AC coupling circuit is provided at the surface and sub-surface with each coupling to the power and data. An illustration of this prior art coupling arrangement is shown in FIG. 3.

In FIG. 3, a surface system 84 and a sub-surface system 88 with a cabled connection 85 therebetween to provide a three-phase power supply to a down hole location. An independent power supply 80 is provided at surface for down hole instrumentation along with a data signal recovery unit 79. The power supply 80 and the data signal recovery unit 79 are both coupled to the cable 85 through the same coupling capacitor 83. Likewise the sub-surface system 88 is coupled to the cable 85 through a single coupling circuit as a capacitor 86. In this prior art system, sub surface power system 89 bleeds power from the signal driver 87. In addition, the coupling 86 does not selectively couple the data, power or host 3-phase power frequency and so the power system can be subject to large variations in power from the host system. Furthermore, more load is placed upon the signal driver 87 by the power regulator 89 and the host system 85, thus creating a requirement for much higher power levels in the transmitter. This requirement adds a larger power transmission requirement to the system than would otherwise be needed thus, further aggravating the problem. This same situation arises at surface 84 where the signal recovery circuit 79 is fed power directly from the independent power supply 80 and the host 3-phase power system 85, and so data recovery is made more difficult. In addition, the amplitude of the recovered data signal sent from sub surface 88 is attenuated by the independent power supply 80 and the host 3-phase power system 85 which are both low impedance at the signal frequency.

Reference is now made to FIG. 4 of the drawings which illustrates a sub-surface system, generally indicated by reference numeral 90, wherein the high voltage supply cable 62 is coupled to a power module 92 within which is provided a first tuned circuit 92a and which is also independently coupled to data signal module 94 within which is provided with second tuned circuit 94a, according to an embodiment of the present invention. Power module 92 is then connected to power supply unit 96 from which is output a regulated power supply 96a. Data signal module 94 is then connected to data source module 98. It will be appreciated that first tuned circuit 92a and second tuned circuit 94a may be passive tuned circuits. In an embodiment the circuits 92a, 94a are capacitively tuned circuits.

In use, when the data communication channel is operational, that is to say data may be transmitted through cable 62, an AC voltage is applied to said cable 62 and an AC data signal is created by data source module 98. The first tuned circuit 92a is tuned to a first frequency corresponding to the power signal frequency. At the same time, the second tuned circuit 94a is tuned to a second frequency corresponding to the data signal frequency such that the first and second frequencies can be selected so as to minimise interference between the power signal and data signal meaning that transmission of data from data source 98 over high voltage system cable 62 can be achieved with minimal distortion of the transmitted and/or the received data being caused by the power module 92.

The AC data signals are typically in the frequency range of 10 kHz to 300 kHz, and independent power frequencies would typically be in the frequency range of 500 Hz to 10 Khz and by having each of the power module and data signal module coupled to cable 62 independently of one another, the frequencies of each can be tuned to optimise the system performance. Such tuning of the first and second tuned circuits 92a, 94a respectively can be performed by selecting either passive or active circuits, with resonant frequencies matching the applied power or data frequencies. The tuned circuits will provide low impedance low loss couplings at the desired frequency and also provide high impedance (and low attenuation) at both the other of the two frequencies and also the host 3-phase power system operating frequency. This can result in a high quality of received data signal component at the surface location of the data communications system. This also reduces the losses in the independent power system to the host 3-phase power system and the data couplings. In addition, such an arrangement further results in the minimisation of interference between the data signal component and power signal components.

Figure 5:
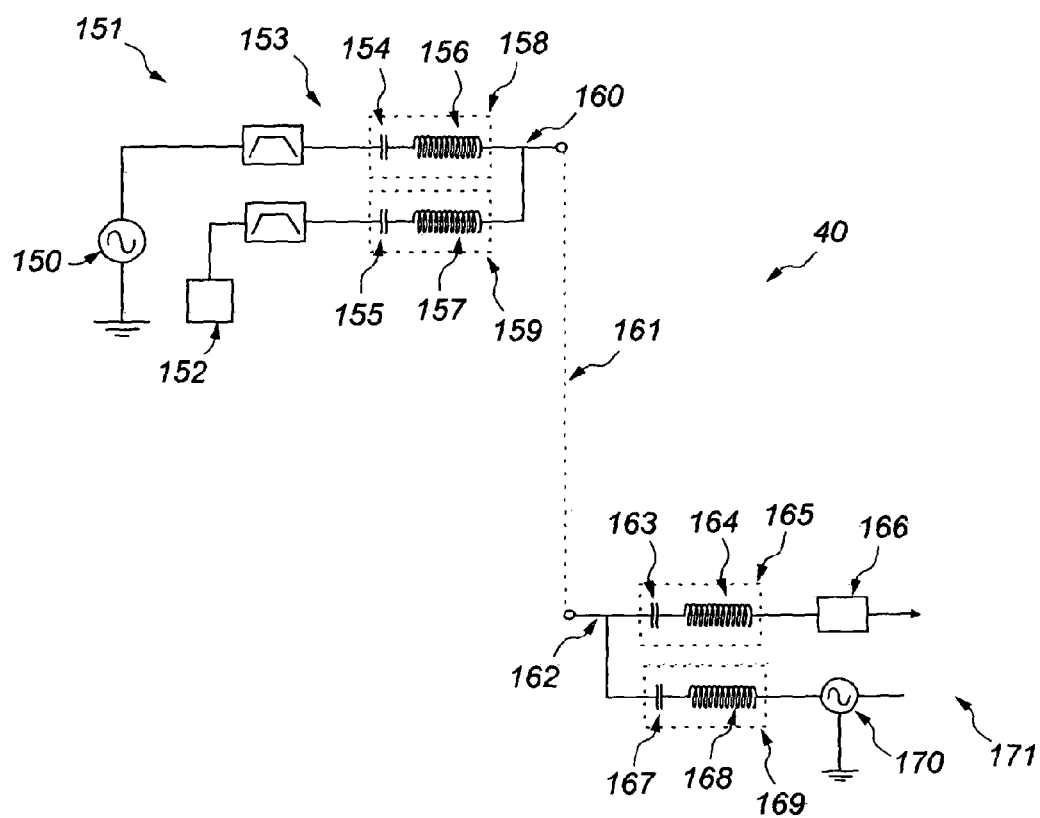
FIG. 5 shows a schematic diagram of a surface to sub-surface data communications system according to a third embodiment of the present invention.

With reference to FIG. 5 there is illustrated a surface and subsurface arrangement of the system 40, according to an embodiment of the present invention. Simple tuned couplings 158, 159, 165 and 169, in this case, include capacitors 154, 155, 163, 167 respectively and inductors 156, 157, 164 and 168 respectively, in series with one another, with the impedance of the tuned couplings 158, 159, 165 and 169 given by $Z=+jwL+1/jwC$ with resonance at $f=1/(2n\sqrt{(LC)})$.

By choosing matching couplings 158 (at the power injection point at surface) and 165 (in the sub surface where power is extracted), the power sub-surface 166 is primarily extracted from the power supply 150 at the frequency of the power supply 150 that was applied to the system 40 and not from the host 3-phase power system frequency. In addition, the sub-surface power 166 does not bleed power from the signal driver 170 in the sub-surface unit 171.

Similarly, using matched couplings for data transmission units 159 and 169 this ensures that the data recovery circuit 152 at surface unit 151 does not receive the relatively high amplitude frequency signals from the host 3-phase power system and the independent power system 150, but, in an embodiment, the signal from the matched signal source 170 and sub-surface coupling 169.

Such a system 40 can be extremely effective where the three frequencies, namely the data, power and three phase system frequencies, are well separated, for instance where the three phase host system is running at 50-60 Hz the independent power system is running at 500 to 10 kHz and the data frequency is running at 10 kHz to 300 kHz.

The principle advantage of the present invention is that it provides a method of data transmission over a three phase power system where the interference between the power signal, data signal and host 3-phase power system is minimised.

A further advantage of the present invention is that it provides a method of data transmission over a three phase power system where the distortion of the transmitted and/or received data signal is minimised.

A yet further advantage of the present invention is that it provides a data communications system for communicating data over a three phase power system wherein the data signal and power signal couplings are completely independent from one another.

Various modifications may be made to the invention herein described without departing from the scope thereof. For example, the system could have two frequencies of transmission with multiple tuned couplings, one per frequency. The tuned coupling may have a processor controlled central frequency. The couplings could consist of both a passive tuned circuit and an active or digital tuned filter.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A data communications system for transmitting data over a three phase power system between a surface and a sub-surface location, the data communications system comprising:
    a surface system module;
    a sub-surface system module; and
    a cable connection between the surface system module and the sub-surface system module,
    wherein a high voltage supply cable is coupled to a power module within which is provided a first tuned circuit and which is independently coupled to a data signal module, wherein the data signal module is comprised of a second tuned circuit,
    wherein the first tuned circuit and the second tuned circuit are tuned to different frequencies, and
    wherein the tuned circuits are capacitively coupled.

2. The data communications system of claim 1, wherein the power module and the data signal module are coupled to a common Y-point at the sub-surface location.

3. The data communications system of claim 1, wherein the power module and the data signal module are coupled to a common point at the surface location.

4. The data communications system of claim 1, wherein each of the surface system module and subsurface system module is provided with a power module and a data signal module.

5. The data communications system of claim 1, further comprising a motor at the sub-surface location.

6. The data communications system of claim 5, wherein the motor is an electrical submersible pump motor.

7. The data communications system of claim 5, wherein the power module and the data signal module are coupled to a common Y-point at the sub-surface location, and the common Y-point is at the motor.

8. The data communications system of claim 5, further comprising a down hole gauge at the sub-surface location, the three phase power supply is used to power the motor, and the power module and the data signal module are used for the down hole gauge.

9. A method of data transmission for transmitting data over a three phase power system between a surface and a sub-surface location, the method comprising:
    providing a cabled connection from the surface to a sub-surface system;
    coupling a high voltage supply cable to a power module within which is provided a first tuned circuit and which is independently coupled to a data signal module, wherein the data signal module is comprised of a second tuned circuit, and
    tuning the first tuned circuit and the second tuned circuit to different frequencies,
    wherein the tuned circuits are capacitively coupled.

10. The method of data transmission of claim 9, further comprising providing a power module and a data signal module at each of a surface system and the sub-surface system.

11. The method of data transmission of claim 9, further comprising:
    providing an AC data signal to the at least one data signal module.

12. The method of power transmission of claim 11, further comprising transmitting the AC data signal in the frequency range of 10 kHz to 300 kHz, and transmitting AC power frequencies in the frequency range of 500 Hz to 10 Khz.

13. The method of power transmission of claim 9, further comprising capacitively coupling the at least one AC power module to the cabled connection, and capacitively coupling the at least one data signal module to the cabled connection.

14. The method of power transmission of claim 9, further comprising coupling the at least one AC power module and the at least one data signal module through a common point on the cabled connection.

15. The data communications system of claim 1, wherein the power module and the data signal module are coupled to a common Y-point at the sub-surface location.

16. The data communications system of claim 15, wherein the power module and the data signal module are coupled to a common point at the surface location.

17. The data communications system of claim 16, wherein each of the surface system module and subsurface system module is provided with a power module and a data signal module.

18. The data communications system of claim 2, wherein the power module and the data signal module are coupled to a common point at the surface location.

19. The data communications system of claim 2, wherein the power module and the data signal module are coupled to a common point at the surface location.

* * * * *